(No Model.) 3 Sheets—Sheet 1.

D. R. BAKER.
MACHINE FOR THE REDUCTION OF SOLIDS.

No. 328,635. Patented Oct. 20, 1885.

Attest:
E. R. Hill
Wm. Strehli

Inventor:
Delos R. Baker
per Wm. Hubbell Fisher,
Atty.

(No Model.) 3 Sheets—Sheet 2.

D. R. BAKER.
MACHINE FOR THE REDUCTION OF SOLIDS.

No. 328,635. Patented Oct. 20, 1885.

Attest:
E. R. Hill
J. Wm. Strehli.

Inventor:
Delos R. Baker
per Wm. Hubbell Fisher
Atty.

(No Model.) 3 Sheets—Sheet 3.
D. R. BAKER.
MACHINE FOR THE REDUCTION OF SOLIDS.

No. 328,635. Patented Oct. 20, 1885.

Attest:
E. R. Hill
Jno. Strebli

Inventor:
Delos R. Baker
per Wm. Hubbell Fisher,
Atty.

UNITED STATES PATENT OFFICE.

DELOS R. BAKER, OF LUDLOW, KENTUCKY.

MACHINE FOR THE REDUCTION OF SOLIDS.

SPECIFICATION forming part of Letters Patent No. 328,635, dated October 20, 1885.

Application filed November 21, 1882. Serial No. 77,277. (No model.)

*To all whom it may concern:*

Be it known that I, DELOS R. BAKER, of Ludlow, in Kenton county and State of Kentucky, have invented certain new and useful Improvements in Machines for the Reduction of Solids, of which the following is a specification.

The several features of my invention and the various advantages resulting from their use conjointly or otherwise will be apparent from the following specification and claims.

Figures 1, 2:
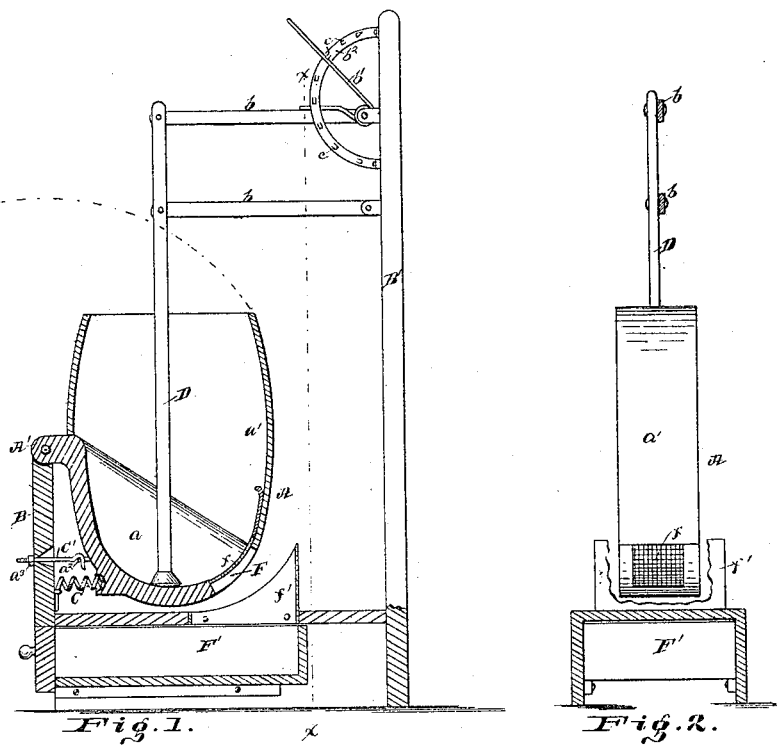
Figure 12:
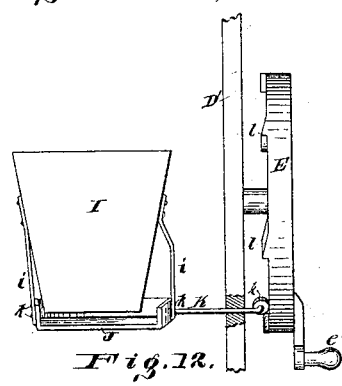
Figure 3:
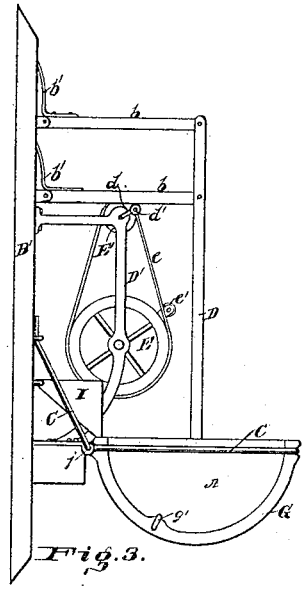
Figure 4:
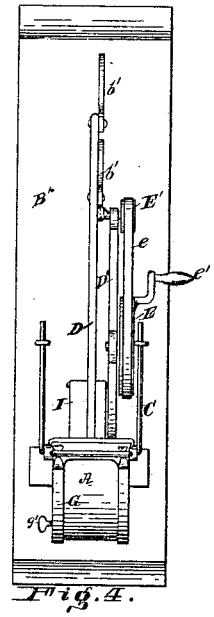
Figure 7:
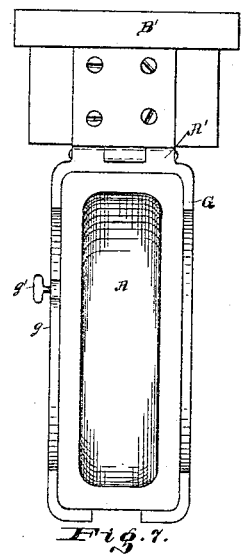
Figure 8:
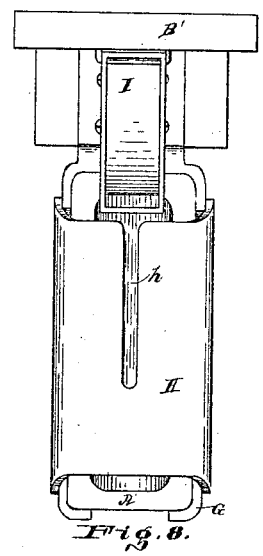
Figure 9:
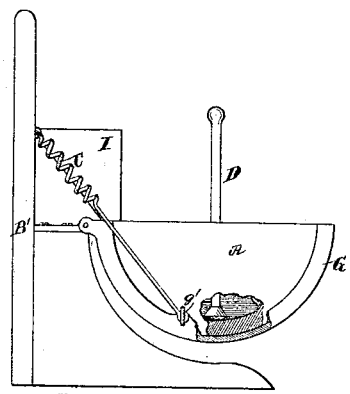
Figure 10:
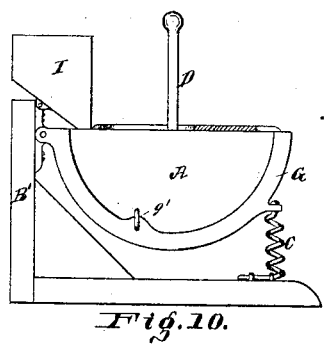
Figure 13:
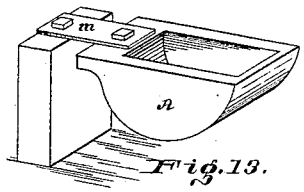
Figure 5:
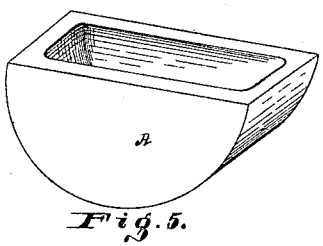
Figure 11:
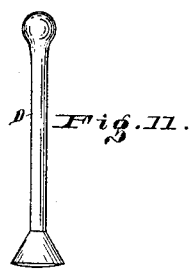

Referring to the drawings forming part of this specification, Figure 1, Sheet 1, is a sectional view representing the preferred form of my invention, the mechanism for operating the pestle being omitted. Fig. 2, Sheet 1, is a view looking toward the left of Fig. 1, those parts which are to the right of the dotted line $x\ x$ in Fig. 1 being omitted. Fig. 3, Sheet 2, is a side elevation showing one form of mechanism for operating the pestle, and showing a slightly-different form of mortar and support from that shown in Fig. 1. Fig. 4, Sheet 2, is a front elevation of the device shown in Fig. 3. Fig. 5, Sheet 3, represents the mortar shown in Figs. 3 and 4 removed from its supporting-frame; and Fig. 6, Sheet 3, represents the supporting-frame for the mortar, the latter being removed therefrom and the frame being detached from the supporting-frame of the machine. Fig. 7, Sheet 2, is a top view showing the mortar shown in Fig. 5 in position in its frame. Fig. 8, Sheet 2, represents the same form of mortar and support, showing a cover applied thereto, and also showing one form of feed-hopper. Figs. 9 and 10, Sheet 3, show the construction of my invention as best adapted for use when the pestle is to be worked directly by hand. Fig. 11, Sheet 3, represents a hand-pestle used in connection with the construction shown in Figs. 9 and 10. Fig. 12, Sheet 1, represents the feed-hopper having a vibrating bottom, and showing a preferred means for vibrating or jarring the bottom to more effectually deliver the substance to be triturated to the mortar. Fig. 13, Sheet 3, shows the mortar connected to its support by a flat spring or elastic strap.

A is the mortar, which is preferably shaped as shown in Figs. 1 and 2, and open at the top, as shown in Fig. 1. This mortar may be made of metal, wedgwood, earthenware, or other desirable material, and may, if desired, be made in one piece, but is preferably made as shown in Fig. 1, the lower part, $a$, being made thick and heavy, and the upper part or hood, $a'$, being of a lighter material—as, for instance, tin, sheet-iron, glass, or the like, this hood being secured to the lower part by any desired means. The bottom $a$ has a lug, $A'$, at one side, by which the mortar is hinged or pivoted to the upper end of post or other suitable support, B. This mortar, being supported at one side only, is capable of vibrating in the arc of a circle, the center of which is formed by the point at which the mortar is pivoted to the post B. Between the side of the bottom $a$ and the post B is a spring, C, a spiral spring being here shown, which, when the machine is at rest, holds the mortar so that its long axis will be approximately vertical, as shown in Fig. 1.

Where it is found desirable to regulate at will the oscillation of the mortar a suitable device is to be employed which shall act directly upon the mortar or indirectly thereon by confining the action of the spring within certain definite limits. One form of such device is as follows: A hook, $C'$, passes through an opening in the post B, and hooks into a staple or eye, $a^2$, in the side of the mortar, and the outer end of this hook is provided with a nut, $a^3$, which may be screwed up against the post, to prevent the bottom of the mortar from moving too far away from the post. When it is desired to empty or clean the mortar, the hook is removed from the eye, and the mortar may then be turned over, as indicated by the dotted line, and will then be bottom side up.

At the side of the mortar which is opposite to the post B is another post, $B'$, extending for a short distance above the top of the mortar, and to this post is pivoted one end of the arms or levers $b$, the other end of which is pivoted to the upper end of the pestle D, the lower end of which passes down into the mortar. Two of such arms as $b$ are preferably employed in order to keep the pestle in a vertical or nearly vertical position. The pestle is preferably continuously pressed down toward the bottom of a mortar by a spring, and the tension of this spring may, when desired, be regulated by some proper device. A suitable spring for such purpose is constructed and located as follows: Above one or both of the arms $b$ is a spring, $b'$, which is coiled around the bolt or rod by which the arm $b$ is pivoted to the post $B'$, and one end of this spring presses down on the upper edge of the arm $b$, and the other end rests against an arc, $b^2$, which is attached to the post $B'$. This arc is provided with a number of projecting pins, $c$, under which the end of the spring $b'$ may be placed. By moving the end of this spring toward the lower end of the arc $b^2$ a greater pressure is exerted by the other end of the spring on the arm $b$, and thus the pestle $D$ may be caused to impinge upon the interior of the mortar or the contents of the latter with a greater or less degree of force, as desired. Another form of spring for accomplishing this same purpose is shown in Fig. 3, one end of the spring being secured to the upper edge of the arms $b$, the other end pressing against the supporting-post. The pestle may be raised by any appropriate mechanism, one form of which is shown in Figs. 3 and 4. In these figures the mortar and the arms $b$ are both pivoted to the same supporting post or frame. To this post is secured a bracket, $D'$, in which bracket is journaled a wheel, $E$, and above this a smaller wheel or pulley, $E'$, and the axle of this latter wheel is provided with a crank, $d$, the end of which is provided with a roller, $d'$, which is preferably made of metal and with a rubber or other elastic tire or periphery. As the wheel $E'$ is caused to turn, the roller $d'$ of the crank $d$ comes in contact with the under side of the lower arm, $b$, and causes it and the pestle to rise, and the spring or springs $b'$ force the pestle down against the mortar or its contents again after the roller leaves the arm, and this movement is repeated as often as the roller by the revolution of the wheel $E'$ comes in contact with the arm $b$.

The wheel $E'$ may be rotated by steam, water, or other power. A mode of rotating the wheel $E'$ by hand is as follows: A band, $e$, passes around the wheel $E'$ and around the hand-wheel $E$, which latter is provided with a handle, $e'$, by which it is turned. As the pestle descends upon the material in the mortar, the latter is caused by the blow of the pestle to vibrate in the arc of a circle, and this movement causes the material being triturated to gradually work up the front side of the mortar—i. e., that side of the mortar which is farthest away from the connection $A'$—the finer particles lying next to the mortar, and the coarser particles will thus fall back under the pestle, and this movement continuing, the particles are caused to pass under the pestle and are all evenly reduced.

If desired, one side of the mortar may be provided with an opening, $F$, located a little above the bottom of the mortar, and this opening guarded by a screen, $f$, removable or otherwise, the fineness of which is governed by the degree of fineness to which it is desired to triturate the substance in the mortar. In the present instance this screen is held in position to the mortar by guide-flanges on the inner face of the mortar and set-screws. As the material being triturated passes under the pestle, it is caused to spread upward over this screen $f$ by a succession of impulses, and those particles which have been pulverized to the required degree of fineness will pass through the screen and fall into a drawer, $F'$, or other receptacle placed below the opening $F$, a guard, $f'$, being preferably employed to conduct the material into the receptacle. The coarser particles in the mortar pass over the screen $f$ and again fall back under the pestle, to be further reduced.

The screen $f$ may be located on the outside of the mortar; but I prefer to place it so as to be flush with the interior of the same, and it may be removed and others substituted having meshes of different sizes.

Figure 6:
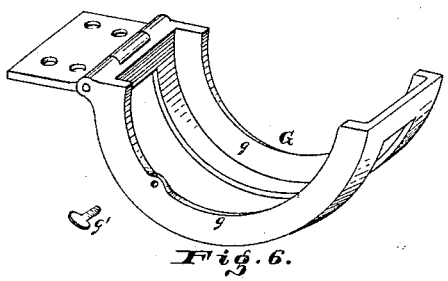

A slightly-different form of mortar and support is shown in Figs. 3 to 10, inclusive. In these figures the mortar $A$ is shaped as shown in Fig. 5, the sides being flat and the bottom semicircular. This mortar, instead of being pivoted directly to a supporting-post, is placed in a frame, $G$, which latter is hinged or pivoted to the supporting-post, adapting the mortar to receive the same motion as in Fig. 1. The bottom of this frame $G$ is semicircular in form, and is preferably open, as shown in Fig. 6, and is provided with the side flanges, $g$, which prevent any lateral displacement of the mortar when in position. This mortar may be placed in the frame $G$ so that its top will be horizontal, or be slipped around in the frame so that one end will be lower than the other, and is secured in the desired position by a set-screw, $g'$, which passes through one of the flanges $g$ of the frame, and may be screwed against the mortar. This inclined position of the mortar in a measure takes the place of the opening $F$, (shown in Fig. 1,) for as the material is pulverized the fine particles are crowded up the side of the mortar, and will pass over the lower side of the mortar and fall into a suitable receptacle.

In Figs. 9 and 10 the spring $C$, which supports the mortar, is somewhat differently connected from the manner shown in Fig. 1, in Fig. 9 being connected to the supporting-frame or post $B'$ above the mortar, and being extensible rather than compressible, and in Fig. 10 being placed between the front end of the mortar and the base of the supporting frame. In Figs. 3 and 4 this spring $C$ is in the form of a torsion-spring, which is passed around the mortar and its supporting-frame $G$, and the ends passed through eyes or lugs $j$ at the sides of the mortar, and then bent up and secured to the post $B'$; or, instead of being so bent up and secured, they may be bent down ward and allowed to rest against the post or support B'.

In Fig. 13 the mortar is shown connected to its support by a flat spring or elastic strap, m, which is attached to the support and mortar by bolts, screws, or the like. These springs (shown in Figs. 3, 4, 9, 10, and 13) in operation and effect are the same as that shown in Fig. 1, the purpose being to hold the mortar in such a manner as to allow it to vibrate in an arc.

If desired, a cover, H, may be placed over the mortar, said cover having downwardly-extending flanges to retain it in position. For the purpose of more securely connecting the cover to the mortar the flanges of the former may be made to embrace flanges upon the latter, substantially as shown in Fig. 4; or a set-screw or other fastening device may be appropriately applied. This cover has a slot, $h$, through which the pestle operates.

In order to insure an even and continuous feed of material to the mortar, I preferably employ a hopper, I, which is placed above or in connection with the mortar, and the hopper or the bottom thereof is adapted to receive a vibratory motion to gradually empty its contents into the mortar. In Figs. 3, 4, 8, 9, and 10 this hopper is hinged or pivoted to the supporting-post B', the lower end of the hopper resting on the end of the mortar, so that the vibrating of the mortar imparts a jarring motion to the hopper.

Another form of hopper is that shown in Fig. 12. In this case the hopper I is stationary, and the bottom or tray J capable of receiving a vibratory motion. This bottom is connected to the hopper I by spring-hangers $i$. To one side of the bottom J is connected a rod, K, which passes through the bracket D', and its end is provided with a roller, $k$, which rests against the edge of the hand-wheel E, the springs $i$ having a tendency to keep the roller $k$ against the wheel. The edge of this wheel is provided with a number of projections or lugs, $l$, which as the wheel is turned come in contact with the roller $k$, causing a vibratory motion to be imparted to the bottom J. The bottom J is preferably attached to the springs $i$ in such a manner that the bottom can be adjusted to any desired inclination, and the rapidity of the feed thus be regulated.

In the present instance the means for enabling the tray to be set at a given inclination consists of the screws $k'$, the lower of which is a pivotal screw, and the upper one is a set-screw.

The pestle may be formed as shown in Figs. 9, 10, and 11, and operated by the hand directly. Where the wheel mechanism is dispensed with, the arms $b$ will, in connection with the pestle-rod, be found convenient in assisting the operator to operate the pestle more uniformly when working the pestle by hand.

As my invention is applicable in the reduction of articles for druggists' use, in the reduction of grains for milling purposes, for the bruising of berries, and for the reduction of ores, and many other things useful in the arts and trades and to the public, the size and capacity of the mortar, the pestle, and their accompaniments will be varied in accordance with the nature of the specific things which are to be reduced.

By the aid of my invention I am enabled to produce a constant and continuous delivery of matter to the mortar and of the triturated or pulverized matter from the mortar.

Having thus described my invention, what I claim as new, and desire to secure by Letters Patent, is as follows:

1. The combination of a pestle, a mortar with a pivotal connection, and an elastic support for enabling the mortar to oscillate during the operation of the pestle, substantially as and for the purposes specified.

2. The combination of a mortar and pestle, D, a pivotal support, as B, and a suitable spring, the mortar being free to vibrate in the arc of a circle about said pivot, substantially as and for the purposes specified.

3. The mortar A, consisting of a heavy bottom portion, $a$, and a lighter upper portion or hood, $a'$, the bottom being provided with a lug, A', in combination with a support, B, to which the lug A' is pivoted, and a spring, C, compressed between the mortar and the support, substantially as and for the purposes specified.

4. In combination with a mortar and means for causing it to reciprocate curvilinearly during the operation of the pestle, the pestle D, arms $b$, and the spring for exerting a downward pressure on the arms, substantially as and for the purposes specified.

5. In combination with a mortar and means for causing it to reciprocate curvilinearly, the pestle D, arms $b$, a spring for exerting a downward pressure on the arms, and means for regulating the pressure of said spring upon said arms, substantially as and for the purposes specified.

6. In combination with a curvilinearly-reciprocating mortar, a hopper, substantially as and for the purposes specified.

7. In combination with a curvilinearly-reciprocating mortar, a reciprocating feeding device and connecting and operating mechanism, substantially as and for the purposes specified.

8. In combination with a pestle and a curvilinearly-reciprocating mortar, a reciprocating feeding device operated by the same mechanism as that which operates the pestle, substantially as and for the purposes specified.

9. In combination with a pestle, a mortar arranged to reciprocate curvilinearly by the blow of the pestle, and a stationary guard for directing the delivery of the contents of the mortar as discharged from the latter, substantially as and for the purposes specified.

10. In combination with a curvilinearly-reciprocating mortar, the pestle and arms $b$, substantially as and for the purposes specified.

11. The combination of a pestle, a curvilinearly-reciprocating mortar operated by the pestle, and a stop, $C'$, for limiting the oscillation of the mortar, substantially as and for the purposes specified.

12. The combination of a curvilinearly-reciprocating mortar, an operating-pestle, the stop $C'$, and spring $C$, substantially as and for the purposes specified.

DELOS R. BAKER.

Attest:
WM. E. JONES,
E. R. HILL.